(No Model.)

W. THOMAS.
Expansive Pulley.

No. 236,195. Patented Jan. 4, 1881.

Witnesses
S. N. Piper
E. B. Pratt

Inventor.
William Thomas
by R. H. Eddy att'y.

UNITED STATES PATENT OFFICE.

WILLIAM THOMAS, OF HINGHAM, MASSACHUSETTS, ASSIGNOR TO MORRIS F. WHITON, OF SAME PLACE.

EXPANSIVE PULLEY.

SPECIFICATION forming part of Letters Patent No. 236,195, dated January 4, 1881.

Application filed December 2, 1880. (No model.)

*To all whom it may concern:*

Be it known that I, WILLIAM THOMAS, of Hingham, of the county of Plymouth and State of Massachusetts, have invented a new and useful Improvement in Expansive Pulleys; and I do hereby declare the same to be described in the following specification and represented in the accompanying drawings, of which—

Figure 1:
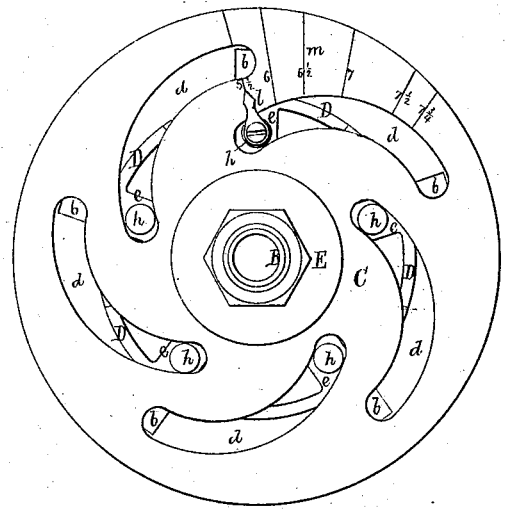
Figure 2:
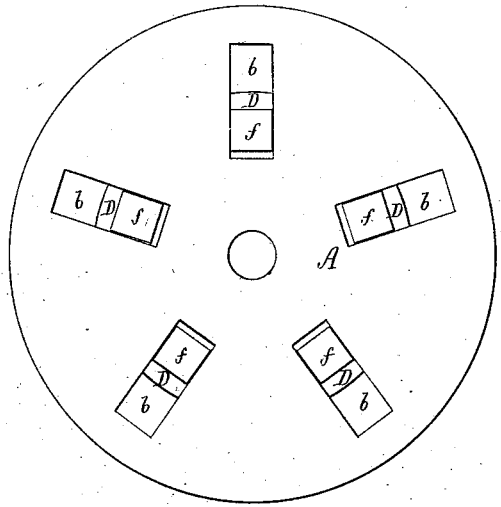
Figure 4:
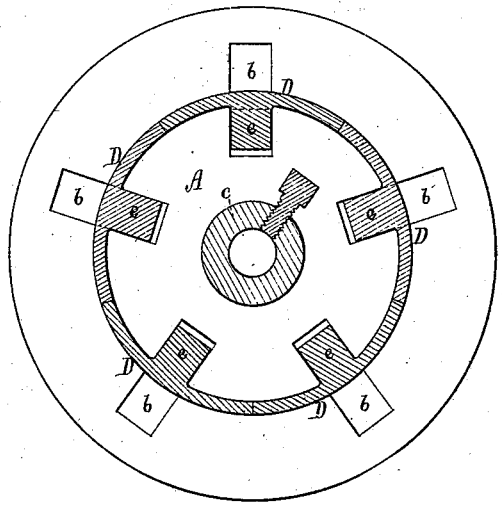
Figures 3, 5:
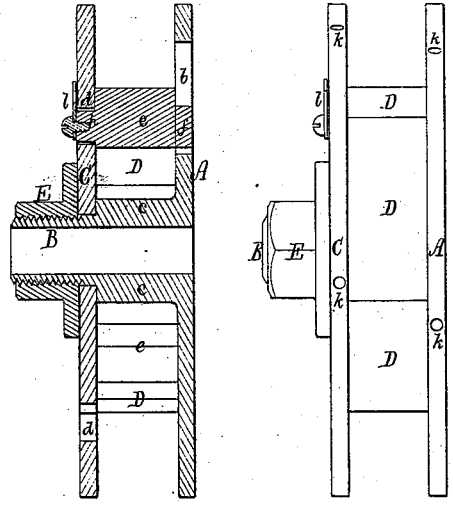

Figures 1 and 2 are opposite side views, Fig. 3 an edge view, Fig. 4 a longitudinal section, and Fig. 5 a transverse section, of a pulley of my improved kind.

The said pulley is composed of a center screw and its clamp-nut, a slotted adjusting-disk, a radially slotted or grooved disk, and a series of rim-sections, constructed, arranged, and applied substantially as hereinafter described, and as illustrated in the said drawings, it being, comparatively speaking, very simple and cheap in construction, easily adjustable, and of much practical value.

In the drawings, A denotes a disk provided with a series of radial slots, $b$, disposed in it as shown. It also has projecting from the central part of the portion $c$ of it, in which the grooves are made, a tubular screw, B, which constitutes a pivot for the slotted adjusting-disk C to revolve on. This latter plate has in it a series of curved slots, $d$, which are arranged in it as represented.

Between the two disks A C there is disposed a set of rim-sections, D, formed as shown. From the shank $e$ of each of such sections a stud, $f$, extends into one of the slots $b$, the slot serving not only to support, but to aid in guiding, the section in its rectilinear movements. Furthermore, a cylindrical stud, $h$, projects from each rim-section into one of the curved slots $d$. The screw B has a clamp-nut, E, screwed upon it and against the outer face of the adjusting-disk C, such nut and screw serving to clamp the disks and the rim-sections firmly together. On turning back the nut and revolving the disk C the rim-section may be moved simultaneously outward or inward relatively to the axis of the screw, in order to vary the diameter of the circle of the ring-sections, as may be required, or, in other words, technically speaking, to expand or contract the pulley.

It will be observed that both of the disks A C project beyond the arcal outer edges of the several rim-sections, and thereby serve as means of maintaining a belt or band in place about such sections. There is made in each disk, at its periphery, a series of radial holes, K, to receive "spanners" or implements used for holding stationary the disk A and turning the disk C when a belt is about the pulley, and it may be desirable to expand the pulley or tighten the belt. Furthermore, there extends from one of the studs $h$ an arm or pointer, $l$, to operate with a scale, $m$, of divisions made on the plate C, as represented, such divisions having suitable numbers against them to indicate diameters of circles to which the rim-sections may be expanded.

I do not claim an expansive pulley having its rim-sections operated by a spirally-slotted plate and by gearing and a hand-wheel, all being as shown and described in the United States Patent No. 78,763.

I claim—

1. The improved expansive pulley, substantially as described, composed of the center screw, B, its clamp-nut E, the slotted adjusting-disk C, the radially-slotted disk A, and the series of radially-movable rim-sections D, constructed, arranged, and applied essentially as set forth.

2. The improved expansive pulley, substantially as described, composed of the center screw, B, its clamp-nut E, the slotted adjusting-disk C, the radially-slotted disk A, and the series of rim-sections D, and provided with the index-pointer $l$ and scale $m$ of divisions, all being arranged, adapted, and to operate essentially as set forth.

WILLIAM THOMAS.

Witnesses:
DAVID WHITON,
SIDNEY SPRAGUE.